(12) United States Patent
Lehmann et al.

(10) Patent No.: US 10,995,802 B2
(45) Date of Patent: May 4, 2021

(54) HYBRID MODULE FOR A MOTOR VEHICLE, AND DRIVE TRAIN HAVING A HYBRID MODULE

(71) Applicant: Schaeffler Technologies AG & Co. KG, Herzogenaurach (DE)

(72) Inventors: Steffen Lehmann, Ettlingen (DE); Andreas Trinkenschuh, Bühl (DE); Elmar Lorenz, Rheinmünster Söllingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 21 days.

(21) Appl. No.: 16/477,538

(22) PCT Filed: Jul. 19, 2017

(86) PCT No.: PCT/DE2017/100597
§ 371 (c)(1),
(2) Date: Jul. 12, 2019

(87) PCT Pub. No.: WO2018/130236
PCT Pub. Date: Jul. 19, 2018

(65) Prior Publication Data
US 2019/0351753 A1 Nov. 21, 2019

(30) Foreign Application Priority Data
Jan. 13, 2017 (DE) .......................... 102017100578.1
Mar. 3, 2017 (DE) .......................... 102017104487.6

(51) Int. Cl.
*F16D 25/10* (2006.01)
*B60K 6/48* (2007.10)
(Continued)

(52) U.S. Cl.
CPC ................ *F16D 25/10* (2013.01); *B60K 6/26* (2013.01); *B60K 6/387* (2013.01); *B60K 6/48* (2013.01);
(Continued)

(58) Field of Classification Search
CPC .. F16D 25/10; F16D 21/06; F16D 2021/0661; B60K 6/26; B60K 6/387; B60K 6/48; B60K 2006/4825
See application file for complete search history.

(56) References Cited

U.S. PATENT DOCUMENTS 6,668,953 B1 * 12/2003 Reik .......................... F02N 5/04
180/53.8
7,293,637 B2 * 11/2007 Janson ................ F16D 25/0638
192/48.611
(Continued)

FOREIGN PATENT DOCUMENTS

CN 101595320 A 12/2009
CN 104204585 A 12/2014
(Continued)

*Primary Examiner* — David R Morris
(74) *Attorney, Agent, or Firm* — LeKeisha M. Suggs

(57) ABSTRACT

A hybrid module for a drive train of a motor vehicle, comprises an electric machine which has a stator and a rotor, a torsional vibration damper which has at least one rotary component, and an integrated clutch device which is constructed as a dual clutch. A rotor carrier which receives the rotor is connected directly via a permanent rotary connection to the at least one rotary component. The rotor carrier forms a clutch component of at least one part-clutch of the clutch device.

10 Claims, 7 Drawing Sheets

(51) Int. Cl.
    *B60K 6/26*       (2007.10)
    *B60K 6/387*      (2007.10)
    *F16D 21/06*      (2006.01)

(52) U.S. Cl.
    CPC ...... *B60K 2006/4825* (2013.01); *F16D 21/06* (2013.01); *F16D 2021/0661* (2013.01); *F16D 2300/22* (2013.01); *F16D 2500/1066* (2013.01)

(56) References Cited

U.S. PATENT DOCUMENTS

| | | | | |
|---|---|---|---|---|
| 7,485,061 | B2* | 2/2009 | Reisch | F16D 25/123 475/5 |
| 7,954,578 | B2* | 6/2011 | Kim | B60K 6/405 180/65.22 |
| 8,317,006 | B2* | 11/2012 | Arnold | B60K 6/485 192/48.611 |
| 8,403,120 | B2* | 3/2013 | Voegtle | F16F 15/13121 192/48.611 |
| 8,602,940 | B2* | 12/2013 | Kuwahara | F16D 25/0638 477/86 |
| 8,714,287 | B2* | 5/2014 | Kim | B60W 10/06 180/65.22 |
| 8,813,935 | B2* | 8/2014 | Hart | B60K 6/387 192/85.25 |
| 8,978,799 | B2* | 3/2015 | Arnold | B60K 6/387 180/65.22 |
| 9,193,255 | B2* | 11/2015 | Arnold | B60K 6/36 |
| 9,267,554 | B2* | 2/2016 | Reitz | B60K 6/48 |
| 10,731,741 | B2* | 8/2020 | Frait | B60K 6/48 |
| 2006/0144665 | A1 | 7/2006 | Janson | |
| 2007/0049445 | A1* | 3/2007 | Reisch | F16D 21/06 475/5 |
| 2007/0267270 | A1* | 11/2007 | Sudau | B60L 3/0061 192/48.614 |
| 2009/0054190 | A1* | 2/2009 | Kim | B60K 6/547 475/5 |
| 2009/0283344 | A1* | 11/2009 | Arnold | F16D 25/123 180/65.22 |
| 2010/0133026 | A1* | 6/2010 | Kim | B60W 10/08 180/65.22 |
| 2010/0282560 | A1* | 11/2010 | Voegtle | F16F 15/13121 192/48.1 |
| 2011/0259698 | A1* | 10/2011 | Arnold | B60K 6/405 192/48.1 |
| 2012/0043176 | A1* | 2/2012 | Arnold | F16D 21/06 192/48.1 |
| 2012/0175212 | A1* | 7/2012 | Hart | B60K 6/387 192/48.601 |
| 2013/0059695 | A1* | 3/2013 | Kuwahara | B60K 6/48 477/86 |
| 2014/0034443 | A1* | 2/2014 | Reitz | B60K 6/48 192/30 V |
| 2017/0122421 | A1* | 5/2017 | Frait | F16D 33/18 |
| 2020/0096053 | A1* | 3/2020 | Lehmann | F16D 25/123 |
| 2020/0156455 | A1* | 5/2020 | Lehmann | F16D 13/74 |
| 2020/0171933 | A1* | 6/2020 | Reimnitz | F16D 21/08 |
| 2020/0215897 | A1* | 7/2020 | Trinkenschuh | B60K 6/387 |

FOREIGN PATENT DOCUMENTS

| | | |
|---|---|---|
| DE | 102005040771 A1 | 3/2007 |
| EP | 2573415 A1 | 3/2013 |
| JP | 2006298272 A | 11/2006 |
| WO | 2010127663 A1 | 11/2010 |
| WO | 2014026685 A1 | 2/2014 |

* cited by examiner

HYBRID MODULE FOR A MOTOR VEHICLE, AND DRIVE TRAIN HAVING A HYBRID MODULE

CROSS-REFERENCE TO RELATED APPLICATIONS

This application is the U.S. National Phase of PCT Appln. No. PCT/DE2017/100597 filed Jul. 19, 2017, which claims priority to DE 10 2017 100 578.1 filed Jan. 13, 2017 and DE 10 2017 104 487.6 filed Mar. 3, 2017, the entire disclosures of which are incorporated by reference herein.

TECHNICAL FIELD

The present disclosure relates to a hybrid module for a drive train of a motor vehicle, such as a passenger vehicle, a truck, a bus or another utility vehicle, having an electric machine which has a stator and a rotor, a torsional vibration damper which has at least one rotary component/oscillating component and an integrated clutch device which is constructed as a dual clutch. The hybrid module consequently has an integrated dual clutch. In addition, the present disclosure relates to a drive train unit having this hybrid module and an internal combustion engine, such as a diesel or an Otto engine.

BACKGROUND

WO 2010/127663 A1 discloses a coaxially arranged hybrid module without a separating clutch. In this hybrid module, a rotor of an electric machine is coupled to a primary mass of a torsion vibration damper, which has a dual mass flywheel and a centrifugal pendulum. A dual clutch is arranged radially inside the electric machine and, furthermore, at least partially axially inside the electric machine.

WO 2014/026685 A1 further discloses a hybrid module with a separating clutch for a drive train of a motor vehicle.

From embodiments known in the prior art, however, it has been found to be disadvantageous that hybrid modules are often relatively complex to assemble and relatively complex in terms of construction. This is intensified by the use of dual clutches.

SUMMARY

An object of the present disclosure is therefore to overcome the disadvantages known from the prior art and in particular to provide a hybrid module which, on the one hand, takes up as little structural space as possible during construction and, on the other hand, has the simplest structure possible.

This is achieved according to the present disclosure by the features of the claims, wherein the characterizing portion involves a rotor carrier which receives the rotor being connected directly via a permanent/durable rotary connection to the at least one rotary component, wherein the rotor carrier forms a clutch component of at least one part-clutch of the clutch device.

A hybrid module with an integrated dual clutch is thereby implemented and, on the one hand, is particularly compact and, on the other hand, as a result of the use of the fewest possible individual clutches, is kept simple in terms of construction. That is to say, a hybrid module according to the present disclosure consequently has an integrated dual clutch. The hybrid module (during operation in the drive train) is arranged between an internal combustion engine and a dual clutch gear mechanism. A rotor of the electric machine is preferably coupled/connected to a secondary mass of the torsional vibration damper and absorbs a torque from the internal combustion engine.

Other advantageous embodiments are claimed in the claims and explained in greater detail below.

It is further advantageous for the torsional vibration damper to have a first rotary component which forms a primary mass and a second rotary component which forms a secondary mass, wherein the two rotary components can be rotated relative to each other by a specific adjustment range and the (permanent) rotary connection is formed/provided between the second rotary component and the rotor carrier. This means that the rotor carrier is permanently connected by means of the (permanent) rotary connection to the second rotary component/secondary mass (so as not to be able to be decoupled during operation of the hybrid module).

In this regard, it is further advantageous for the first rotary component to be prepared (directly) for rotationally secure fitting/connection to an output shaft (crankshaft) of an internal combustion engine so that a torque can be absorbed by the internal combustion engine and by the rotor carrier via the first rotary component and the second rotary component.

It is also advantageous for the torsional vibration damper to be formed by combining a bow spring damper and a speed-adaptive damper (the damper preferably being a centrifugal pendulum). Particularly advantageous embodiments are thereby achieved with respect to the torsional vibration damper.

If the electric machine is fluid-cooled, that is to say, if the electric machine is cooled by means of a cooling device, preferably a fluid cooling device, such as a water cooling device, another increase in the degree of efficiency of the electric machine is produced in spite of the narrow structural space. In particular, it is preferable for the cooling device to be constructed to flow directly around the stator with cooling fluid.

If the rotary connection is constructed as a plug-in tooth arrangement, the ease of assembly of the hybrid module is further increased.

Furthermore, it is advantageous for the dual clutch to be fluid-cooled, preferably liquid-cooled/hydraulically cooled, more preferably oil-cooled, wherein there is provided a fluid distributor unit which serves to support the rotor carrier (preferably relative to a gear input shaft).

In this context, it is additionally advantageous for an actuation piston in each case of a part-clutch of the dual clutch to be provided in/on the fluid distributor unit/integrated therein. Furthermore, it is preferable for a fluid return (hydraulic medium/oil return) to be directly integrated in a component which is secured to the housing or a housing of the hybrid module. An even more compact construction type is thereby produced.

If the dual clutch is provided with a separately controllable fluid cooling, the efficiency of the drive train, in which the hybrid module is preferably fitted, is further increased.

It is further advantageous for a rotor position sensor which detects a rotation position of the rotor (during operation) and/or a temperature sensor which detects a temperature in the hybrid module (during operation) to be provided.

The present disclosure further relates to a drive train for a motor vehicle having the hybrid module according to the present disclosure according to at least one of the above-described embodiments and having an internal combustion engine, wherein an output shaft of the internal combustion engine is (preferably permanently) connected to the torsional vibration damper in a rotationally secure manner.

In this regard, it is in turn advantageous for the output shaft of the internal combustion engine to be (preferably permanently) connected to the first rotary component of the torsional vibration damper in a rotationally secure manner. The rotor carrier can be connected by means of the dual clutch to one of two gear input shafts of a dual clutch gear mechanism.

That is to say, a hybrid module having an integrated dual clutch is consequently implemented according to the present disclosure. The hybrid module is preferably arranged between an internal combustion engine and a dual clutch gear mechanism in the drive train. A torsional vibration damper, which constitutes a combination of a bow spring damper and a speed-dependent vibration damper, is connected to a crankshaft. A rotor of an electric machine is connected to a secondary mass of the torsional vibration damper and thereby absorbs during operation torque from the internal combustion engine. Preferably, the hybrid module is a P1 hybrid module (rotation axes of the rotor and the part-clutches of the clutch device coaxial with each other) without a separating clutch (between the internal combustion engine and the electric machine) in order to separate the internal combustion engine from the drive train (that is to say, during operation, the internal combustion engine is permanently coupled to the electric machine).

BRIEF DESCRIPTION OF THE DRAWINGS

The present disclosure is now described in greater detail below with reference to different Figures together with a preferred embodiment.

In the drawings.

The Figures are purely schematic in nature and serve exclusively to assist the understanding of the present disclosure. Identical elements are given the same reference numerals.

DETAILED DESCRIPTION

Figure 1:
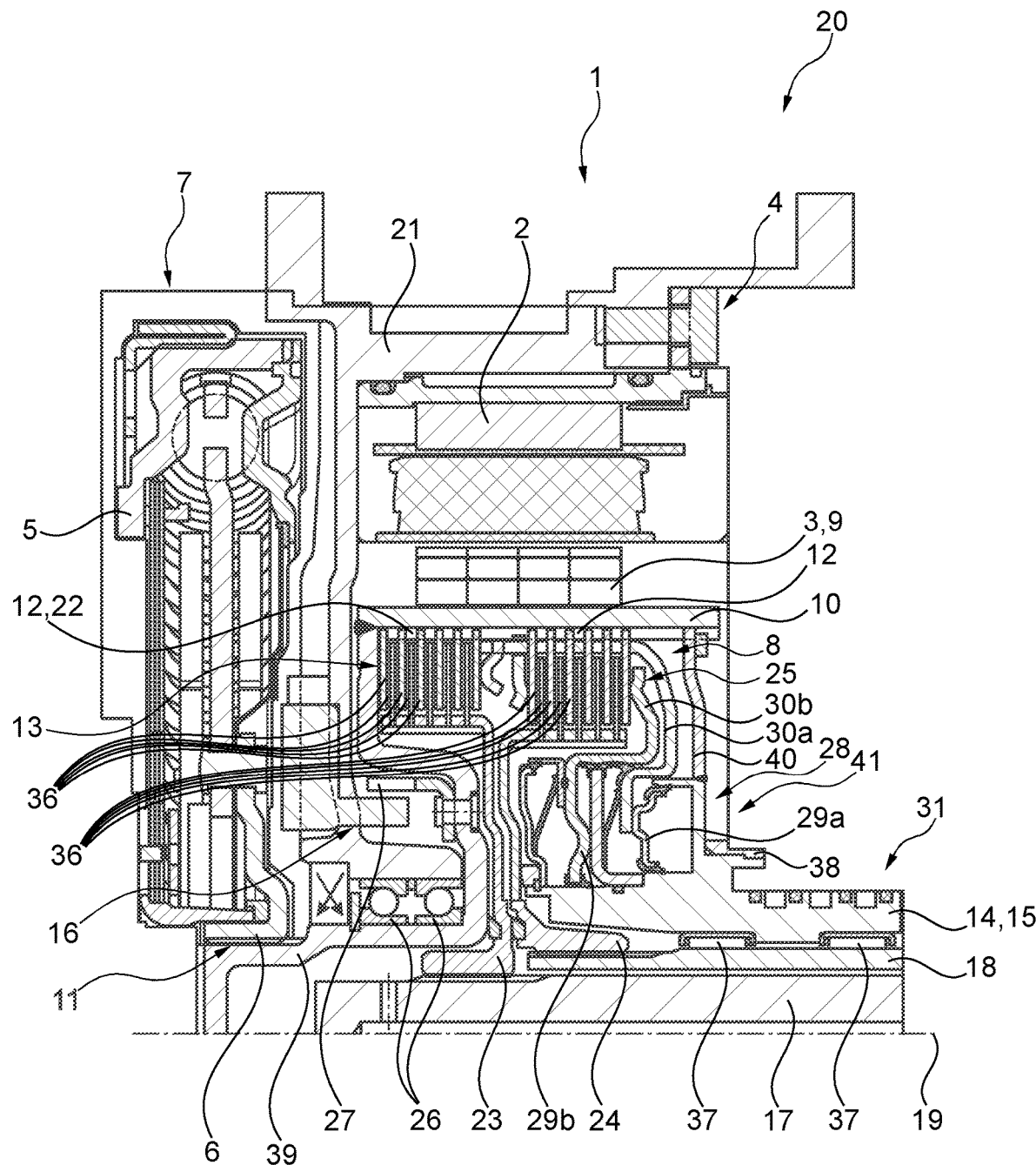
FIG. 1 is a longitudinal section of a hybrid module according to the present disclosure according to a preferred embodiment, wherein the hybrid module is already operationally connected to gear input shafts of a dual clutch gear mechanism.

In FIG. 1, a preferred embodiment of the hybrid module 1 according to the present disclosure is illustrated in its entirety. The hybrid module 1 is typically a combination of a clutch arrangement and an electric machine 4 (electric motor). The hybrid module 1 is in FIG. 1 already fitted in a partially illustrated drive train 20 of a motor vehicle. The hybrid module 1 is connected to a gear mechanism in the form of a dual clutch gear mechanism, which is also not illustrated in greater detail in this instance. In particular, the hybrid module 1 is already coupled to two gear input shafts 17 and 18 of the gear mechanism. Furthermore, the hybrid module 1 is in an operation coupled to an internal combustion engine/a combustion engine which is not illustrated here for reasons of clarity. The hybrid module 1 is constructed as a P1 hybrid module. With such a P1 hybrid module 1, a rotor 3 of the electric machine 4 is arranged with the rotation axis thereof coaxial relative to a central rotation axis 19 of the hybrid module 1/a clutch device 8 of the hybrid module 1. The clutch device 8 which is present in the hybrid module 1 and which is constructed in this instance as a dual clutch is arranged in a radial direction inside the rotor 3. The electric machine 4 is in this embodiment connected to a 48V on-board power supply network.

In addition to the clutch device 8, the hybrid module 1 has a torsional vibration damper 7. This torsional vibration damper 7 in turn has two rotary components 5 and 6 which each form an oscillating mass. In particular, a first rotary component 5 is constructed as a primary (oscillating) mass and during operation is fitted in a rotationally secure manner to an output shaft/crankshaft of the internal combustion engine. A second rotary component 6 is constructed as a secondary (oscillating) mass. The second rotary component 6 is connected to the first rotary component 5 in a rotationally secure manner, but can be displaced/rotated through a specific rotation range/displacement range relative to the first rotary component 5 in a peripheral direction. The first rotary component 5 is arranged so as to be damped in terms of vibration relative to the second rotary component 6. The vibration damper 7 forms in particular a type of dual-mass flywheel. Furthermore, the torsional vibration damper 7 forms a bow spring damper which has a plurality of bow springs which are clamped in a peripheral direction between the first rotary component 5 and the second rotary component 6. The bow springs are during operation, depending on the vibrations/rotary oscillations acting on the two rotary components 5, 6, resiliently compressed in the rotation range of the first rotary component 5 relative to the second rotary component 6. Furthermore, the torsional vibration damper 7 is constructed in such a manner that it as a whole forms a speed-adaptive damper. This damper acts in turn as a centrifugal pendulum.

The electric machine 4 of the hybrid module 1 has in addition to the rotor 3 a stator 2 which is securely fitted/received in a module housing 21. The stator 2 is as a whole constructed in an annular manner, wherein the rotor 3 which is also constructed substantially in an annular manner is arranged radially inside the stator 2. The rotor 3 is in this instance rotatably supported or received by means of a rotor carrier 10. The rotor carrier 10 is constructed as a substantially pot-like carrier element and receives at a sleeve region 22 which is arranged radially at the outer side of a rotor coil 9 which forms the rotor 3. The rotor coil 9 is, for example, formed by a sheet metal assembly.

The rotor carrier 10 also acts as a clutch component of the clutch device 8. The rotor carrier 10 forms in particular a first clutch component 12 which can be selectively connected to another second clutch component 23 of a first part-clutch 13 of the dual clutch 8 or to another second clutch component 24 of a second part-clutch 25 of the dual clutch 8. The dual clutch 8 is constructed as a friction clutch. Consequently, each part-clutch 13 and 25 is constructed as a friction clutch. In particular, the two part-clutches 13 and 25 are each constructed as friction plate clutches. In addition, the dual clutch 8/the part-clutches 13 and 25 is/are each constructed to run wet. However, the dual clutch 8 is in principle in other embodiments also constructed to run dry. The rotor carrier 10 therefore forms both a first clutch component 12 of the first part-clutch 13 and a first clutch component 12 of the second part-clutch 25.

The first clutch component 12 of the respective part-clutch 13, 25 is constructed on the sleeve region 22 of the rotor carrier 10 at a side radially remote from the rotor coil 9. Consequently, the first clutch component 12 is formed at a radial inner side of the sleeve region 22. Each clutch component 12 is additionally provided with a plurality of friction elements 36 which are constructed as friction plates. In a first axial portion of the sleeve region 22, the friction elements 36 associated with the first part-clutch 13 and in a second axial portion of the sleeve region 22 arranged axially spaced apart from the first axial portion, the friction elements 36 associated with the second part-clutch 25 are arranged and received on the rotor carrier 10 in a rotationally secure manner. Between two adjacent friction elements 36 on the first clutch component 12 of the respective part-clutch 13, 25, a friction element 36 protrudes in a typical manner in a second clutch component 23 or 24 of the respective part-clutch 13, 25. The two second clutch components 23 and 24 are in turn constructed in a pot-like manner. The second clutch component 23 of the first part-clutch 23 is connected to a first gear input shaft 17 which is constructed as a solid shaft and the second clutch component 24 of the second part-clutch 24 is connected to a second gear input shaft 18 which is arranged radially outside the first gear input shaft 17 and which is constructed as a hollow shaft.

Furthermore, the rotor carrier 10 is according to the present disclosure connected to the second rotary component 6 directly via a permanent rotary connection 11. This permanent rotary connection 11 is constructed as a plug-in tooth arrangement/notch tooth arrangement. Consequently, during operation the rotor carrier 10 or the first clutch component 12 of the respective part-clutch 13, 25 is permanently coupled in a rotationally secure manner to the second rotary component 6 and consequently during operation to an output shaft (crankshaft) of the internal combustion engine. A separate separating clutch, by means of which it is possible to decouple the first rotary component 5 from the rotor carrier 10, is not present. Consequently, the rotor carrier 10 forms a permanent rotary connection to the torsional vibration damper 7.

The rotor carrier 10 is rotatably supported by means of two roller bearings 26 relative to the module housing 21. The two roller bearings 26 are constructed together as dual ball bearings, that is to say, as a dual angular contact ball bearing.

In order to detect the rotation position of the rotor carrier 10 relative to the module housing 21 during operation, a rotor position sensor 16 is provided. The rotor position sensor 16 is fitted to the module housing 21 and cooperates with an encoder 27 which is connected to the rotor carrier 10 in a rotationally secure manner in such a manner that it detects the rotation position of the rotor carrier 10 during operation. Furthermore, but not illustrated here in detail for reasons of clarity, a temperature sensor is arranged inside the module housing 21.

In order to actuate the respective part-clutch 13 and 25, a fluid (in this instance, hydraulic, alternatively pneumatic) actuation system is provided. This actuation system 28 has per part-clutch 13, 25 a first piston 29*a* (first actuation piston) or a second piston 29*b* (second actuation piston). The first piston 29*a* cooperates with a first actuation element 30*a* in the form of a pressure vessel which in turn acts directly in a displacing manner on the friction elements 36 of the first part-clutch 13 and consequently displaces the first part-clutch 13 between the engaged and disengaged position thereof. A second actuation element 30*b* in the form of a pressure vessel is coupled to the second piston 29*b* and in turn actuates the second part-clutch 25 between the engaged and disengaged position thereof. In particular, the second actuation element 30*b* is constructed integrally with the second piston 29*b*. The two pressure vessels/actuation elements 30*a*/30*n* are fitted radially one inside the other.

Figure 2:
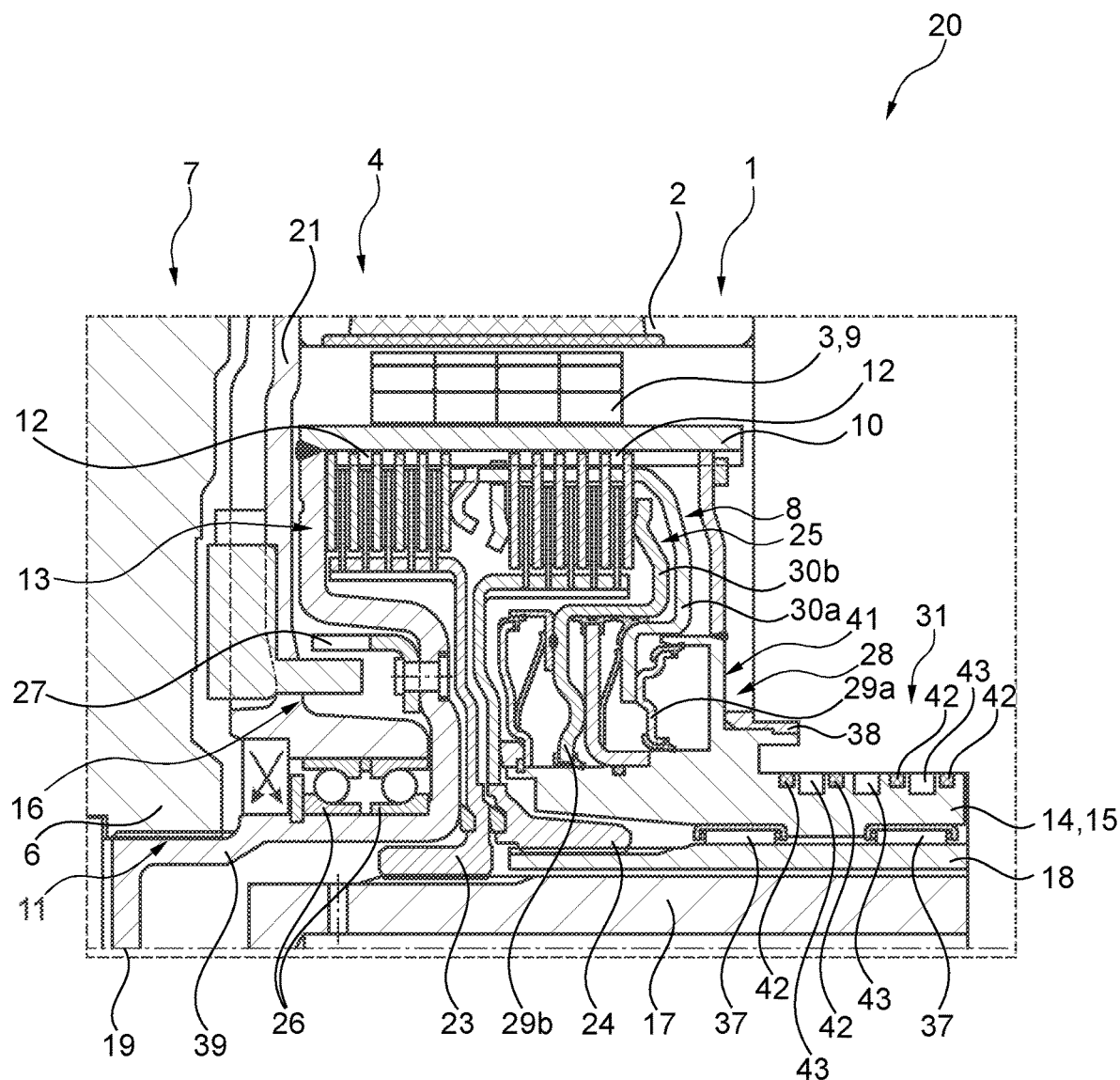
FIG. 2 is a detailed view of the longitudinal section according to FIG. 1 in a region of two part-clutches of a clutch device which is constructed as a dual clutch and a rotor carrier of a rotor of an electric machine of the hybrid module.
Figure 3:
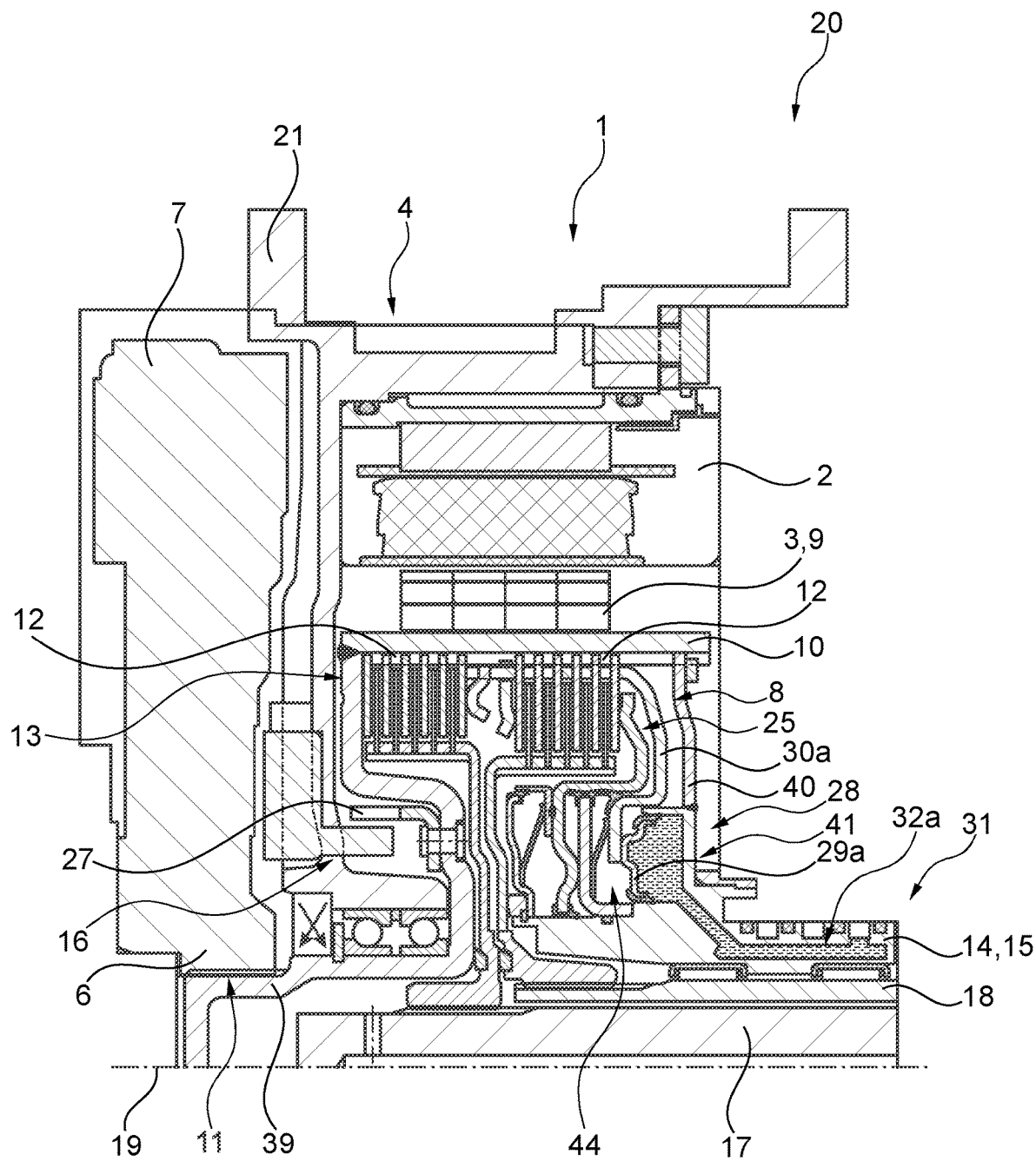
FIG. 3 is a longitudinal section of the hybrid module of FIG. 1, wherein an actuation of a first part-clutch of the dual clutch is illustrated.
Figure 4:
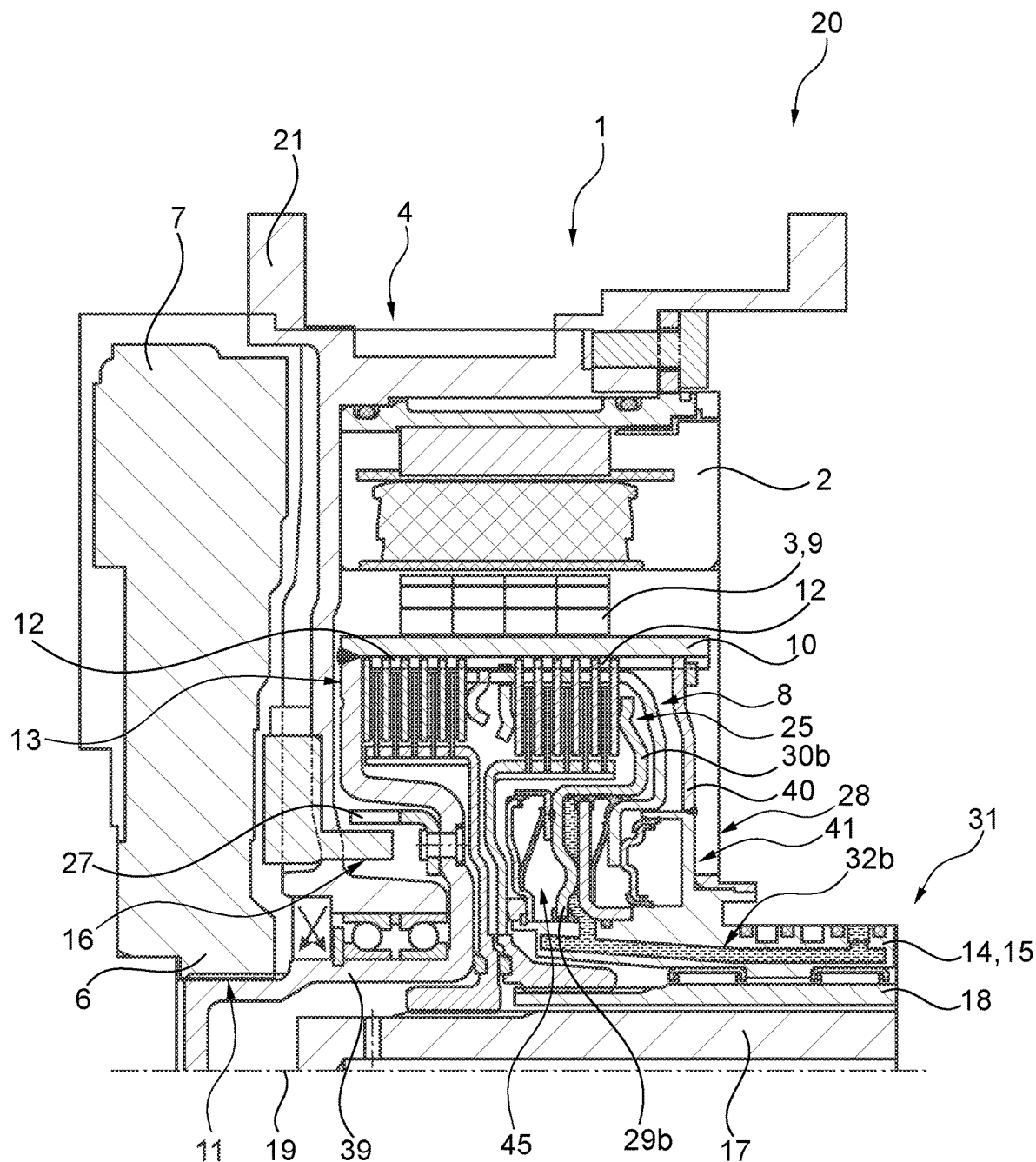
FIG. 4 is a longitudinal section of the hybrid module similar to FIG. 1, wherein the actuation of a second part-clutch of the dual clutch is now illustrated.

The actuation system 28 can be seen in detail in FIG. 2. In this instance, it can also be clearly seen that the actuation system 28 is coupled to a fluid supply 31. The fluid supply 31 is provided in a central component 15 which is preferably further supported/mounted relative to a housing of the gear mechanism. Consequently, the component 15 is coupled to the rotor carrier 10 and the rotor carrier 10 is supported via this component 15. In particular, this component 15 acts as a fluid distributor unit 14. The fluid supply 31 has a plurality of supply channels 32*a*, 32*b*, 32*c* which are introduced in the component 15 which is secured to the housing and which can be acted on independently of each other with pressure. A first supply channel 32*a*, as can be seen in FIG. 3, serves in the state thereof acted on with pressure to actuate and consequently engage the first part-clutch 13. In this instance, a corresponding pressure chamber in the piston 29*a* is filled. A second supply channel 32*b*, as can be seen in FIG. 4, serves in the state thereof acted on with pressure to actuate and consequently engage the second part-clutch 14. In this instance, a corresponding pressure chamber in the piston 29*b* is filled.

A toothed wheel 38 formed on the component 15 serves during operation to drive a fluid or oil pump and is connected to the rotor carrier 10.

As a result of this construction, the rotor carrier 10 when viewed in an axial direction of the dual clutch 8 is also supported at two opposing axial sides. The component 5 is for this purpose supported via additional second roller bearings 37 relative to the second gear input shaft 18.

Preferably, the fluid supply 31/fluid distributor unit 14 can be controlled separately. That is to say, the fluid distributor unit 14 can in particular be controlled separately from an engine cooling of the internal combustion engine.

Furthermore, in the hybrid module 1 a fluid cooling which is implemented by a cooling device 35 is provided. This serves to flow around the part-clutches 13, 25 (in particular the friction elements 36) during operation with a cooling fluid flow. According to FIG. 5, a first cooling channel 33*a* of this cooling device 35 is formed by means of a hole which extends in an axial direction (along the rotation axis 19) in the first gear input shaft 17, an adjacent second hole which extends in a radial direction and an intermediate space between the second clutch component 23 and the rotor carrier 10. A first cooling fluid flow is thereby directed from a radially inner region on the first gear shaft 17 in a radial direction outward to the friction elements 36 of the first part-clutch 13.

Figure 6:
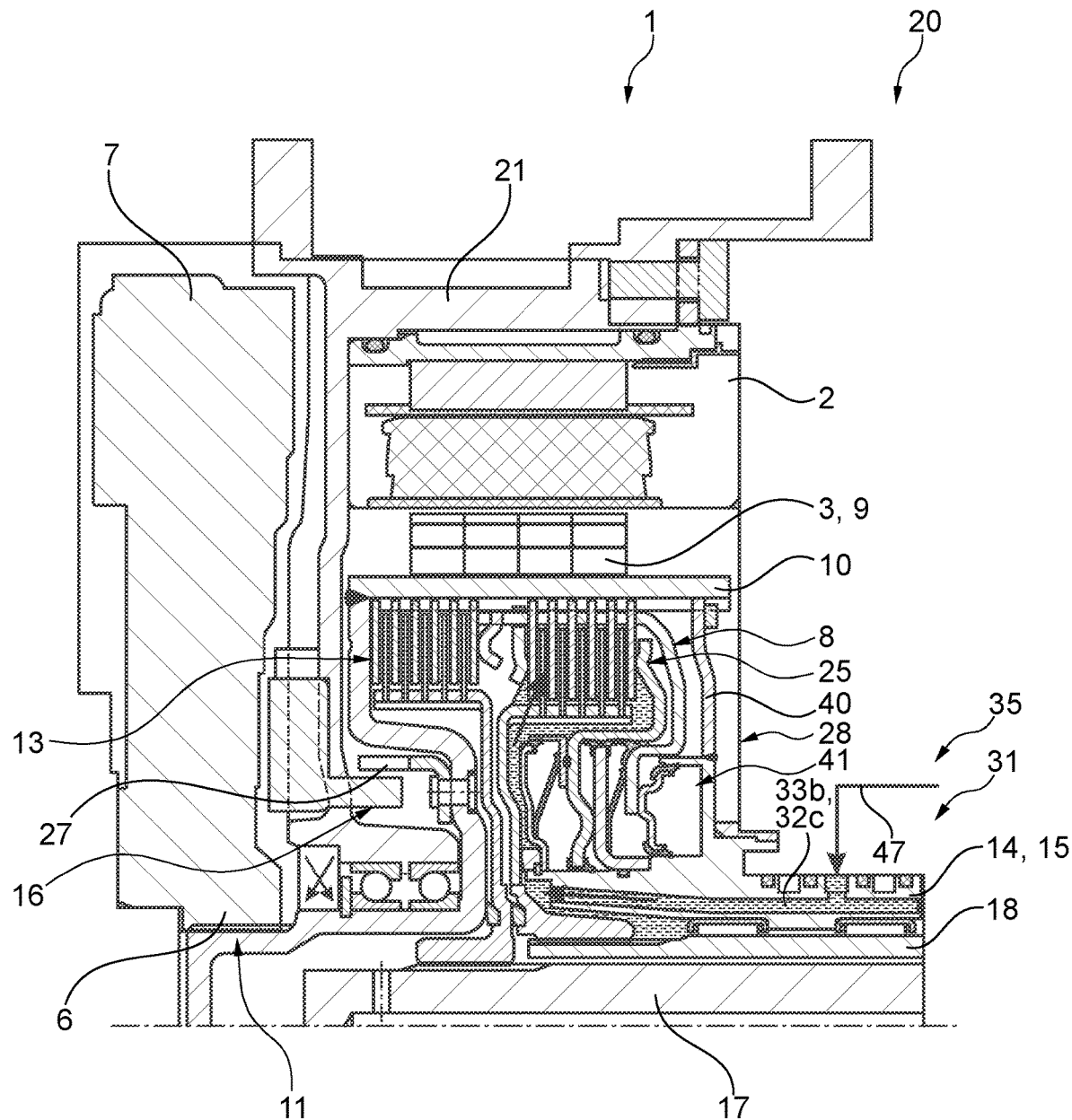
FIG. 6 is a longitudinal section of the hybrid module similar to FIG. 1, wherein a cooling fluid flow which serves to cool the second part-clutch is illustrated.

According to FIG. 6, a second cooling channel 33*b* of the cooling device 35 is also implemented in the fluid distributor unit 14. The second cooling channel 33*b* is consequently a third supply channel 32*c* of the fluid distributor unit 14. To this end, in the central component 15 there is provided a separate channel which is constructed from several holes and which opens in an inner space of the hybrid module 1. A first portion of the second cooling channel 33*b* is therefore formed directly in the central component 15. This first portion is adjoined by a second portion of the second cooling channel 33*b* which is formed by an intermediate space between the second clutch component 24 and the second piston 29*b* and which extends outward in a radial direction. Through the second cooling channel 33*b* during operation a second cooling fluid flow is again supplied to the hybrid module 1 and flows from the radial inner side at the side of the central component 15 toward the friction elements 36 of the second part-clutch 25. Since the fluid cooling is configured as a hydraulic cooling, the dual clutch 8 in this embodiment is in particular hydraulically cooled. However, embodiments with pneumatic cooling can also be implemented.

Figure 7:
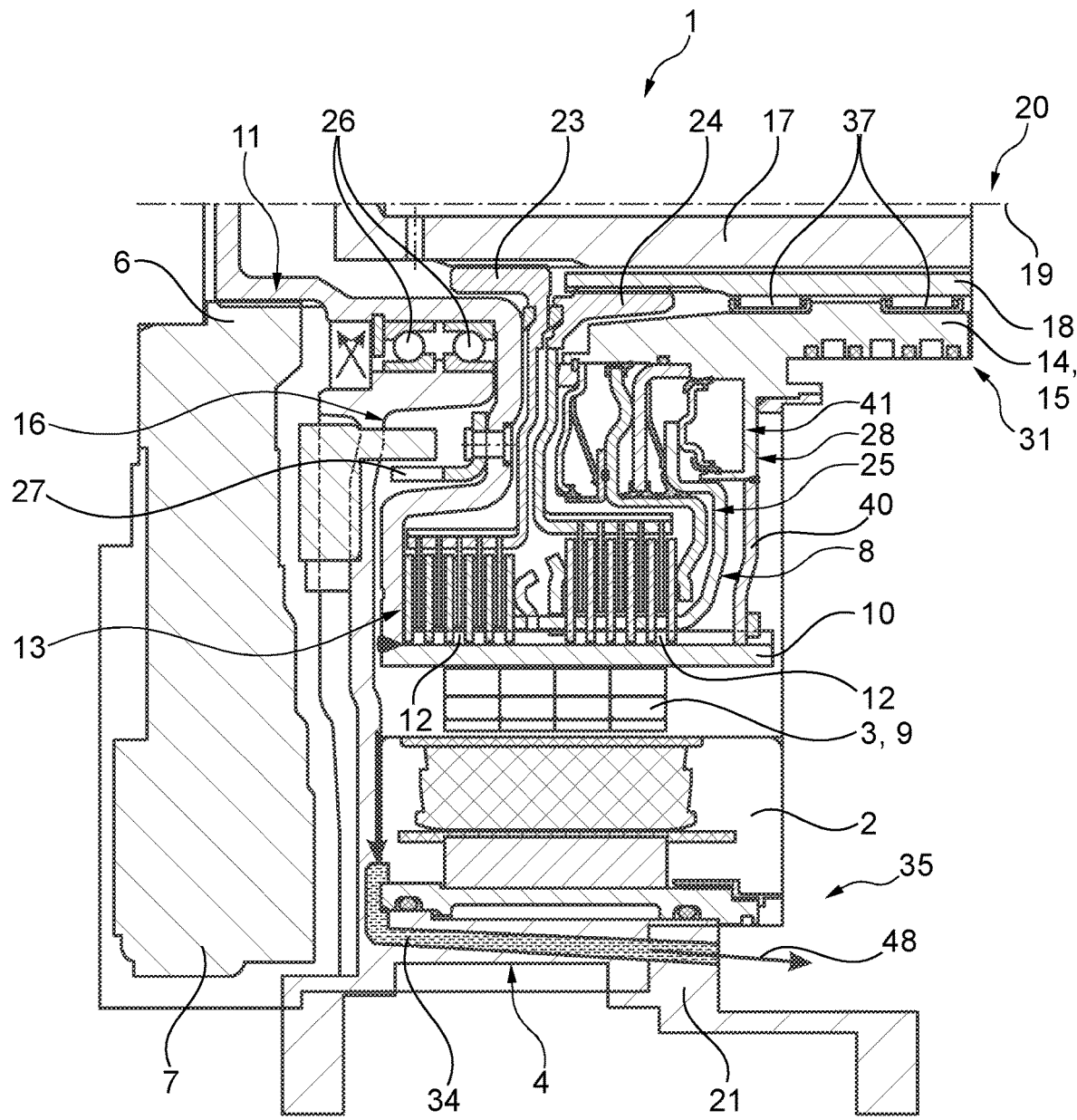
FIG. 7 is a longitudinal section of the hybrid module similar to FIG. 1, wherein a discharge of a cooling fluid from the inner side of the hybrid module past a stator of the electric machine is illustrated.

Furthermore, it can be seen in FIG. 7 that the electric machine 4, in particular in the region of the stator 2, is also constructed to be fluid-cooled, that is to say, preferably hydraulically/fluid-cooled. A cooling fluid flow is directed in a radial direction selectively past the stator 2 and discharged radially outside the stator 2 through a discharge channel 34 which forms a fluid return from the inner side of the module housing 21. The stator 2 is thereby during operation also cooled by the cooling device 35. The discharge channel 34 is fitted partially in the module housing 21. Alternatively or additionally, the electric machine 4 (in particular the stator 2) is in another embodiment cooled by means of an additional cooling circuit, preferably a water cooling circuit.

In other words, consequently, some aspects of the hybrid module 1 according to the present disclosure are:
  P1 hybrid module 1 (without separating clutch) with fluid/oil-cooled dual clutch
  water-cooled electric machine 4,
  use of a bow spring damper 7 with centrifugal pendulum for oscillation isolation
  dual-side support of the rotor carrier 10,
  pressure vessels which are fitted radially one inside the other,
  integration of an actuation piston 29*a*, 29*b* in a fluid or oil distributor unit 14, which at the same time supports the rotor carrier 10,
  separately controllable clutch cooling 35,
  oil return integrated in the housing,
  integrated rotor position and temperature sensors 16,
  operating voltage of 48 Volts.

FIG. 1 illustrates a hybrid module 1 as a main cross-section. A hybrid module 1 is positioned between an internal combustion engine and a dual clutch gear mechanism. A torsional vibration damper (rotary vibration damper 7) as a combination of a bow spring damper and a speed-adaptive damper is screwed to a crankshaft and transmits an engine torque to a rotor unit of the hybrid module 1 via a plug-in tooth arrangement. The hybrid module 1 has a housing (module housing 21) in which the stator 2 of a water-cooled electric machine 4 is mounted by means of screws. The rotor 3 of the electric machine 4 is fixed to a rotor unit in a rotationally secure manner. Inside this rotor unit, a fluid or oil-cooled dual clutch 8 comprising part-clutches 13 and 25 is integrated. The rotor unit is supported at both sides by means of roller bearings 26 in the housing 21 and by means of roller bearings 37 on a hollow shaft 18. A rotor position sensor 16 and temperature sensors which are not illustrated can be integrated in the housing 21. This housing is sealed in a fluid or oil-tight manner with respect to the environment and is only opened in the direction toward the gear mechanism. A toothed wheel 38 may be connected to the rotor unit in order to drive a fluid or oil pump.

FIG. 2 shows an enlarged cut-out of the hybrid module 1. An input shaft 39 is connected to a rotor carrier 10 in one part or multiple parts (for example, by means of welding). A fluid or oil distributor unit 14 is connected to a flange 40 in one or several pieces and forms with the rotor carrier 10 and the input shaft 39 the rotor unit. An encoder ring 27 of the rotor position sensor 16 is also secured thereto in a rotationally secure manner. Outer plates 36 of the dual clutch 8 are supported in the rotor carrier 10 in a rotationally secure and axially displaceable manner. Inner plates 37 are connected in a rotationally secure and axially displaceable manner to hubs 23, 24 which are connected by means of plug-in tooth arrangements to a solid shaft 17 or a hollow shaft 18 of the two part-gear mechanisms of the dual clutch gear mechanism. Pressure vessels 30*a*, 30*b* which are fitted one inside the other and sealed with respect to each other transmit axial forces from pistons 29*a*, 29*b* to respective plate assemblies 36. The fluid or oil distributor unit 14 has a cylinder 41 for actuating a clutch 13, rotary transmissions 43 which are sealed by means of piston rings 42 and distributor holes for controlling and cooling the clutches 13, 25. There is secured thereto in an axially secure and sealed manner in at least one direction a support ring 43 which absorbs a pressure of a cylinder 41 of a clutch 25.

FIG. 3 shows an actuation of a first part-clutch 13 of the hybrid module 1. Via a channel 32*a*, pressure oil or fluid is introduced into the fluid or oil distributor unit 14 which directs it via holes into the cylinder 41. A compensation cylinder 44 ensures a necessary pressure compensation under speed. A restoring plate spring for pushing back a piston 29*a* and consequently for opening the clutch 13 is also integrated therein.

FIG. 4 shows an actuation of a second part-clutch 25 of the hybrid module 1. Via a channel 32*b*, pressure oil or fluid is introduced into the fluid or oil distributor unit 14 which directs it via holes into the cylinder 41. A compensation cylinder 45 ensures a necessary pressure compensation under speed. A restoring plate spring for pushing back a piston 29*b* and consequently for opening the clutch 25 is also integrated therein.

Figure 5:
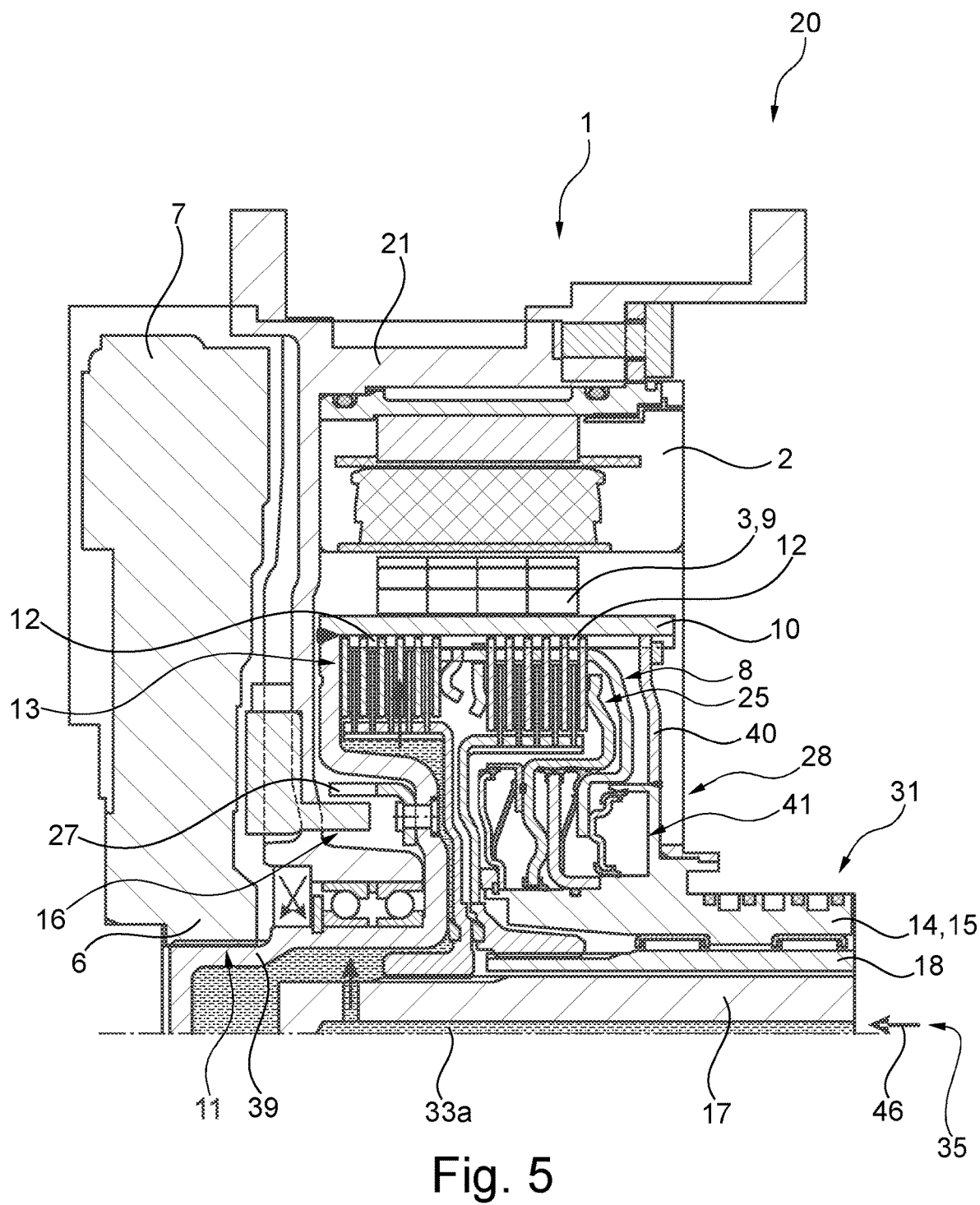
FIG. 5 is a longitudinal section of the hybrid module similar to FIG. 1, wherein a cooling fluid flow which serves to cool the first part-clutch is illustrated.

FIG. 5 shows a cooling of the first part-clutch 13 of the hybrid module 1. Via rotary transmissions, cooling oil or fluid 46 is guided into the solid shaft 17 and via transverse openings therein and in corresponding thrust washers into the clutch 13.

FIG. 6 shows a cooling of the second part-clutch 25 of the hybrid module 1. Via rotary transmissions, cooling oil or fluid 47 is guided into the fluid or oil distributor unit 14 and via holes and transverse openings in corresponding thrust washers into the clutch 25.

FIG. 7 shows a drain of a cooling oil or fluid for the first and second part-clutch 13, 25 of the hybrid module 1. The cooling oil or fluid 48 accumulates in a sump in a region of the electric machine 4. For discharge there is provided at least one opening which directs this fluid into the sump of the gear mechanism. Consequently, a flooding of the electric machine 4 is prevented.

Although the present disclosure has been described above with reference to one embodiment, it is self-evident that different embodiments and modifications can be carried out without departing from the scope of the present disclosure, as defined in the appended claims. With reference to additional features and advantages of the present disclosure, reference is expressly made to the disclosure of the drawings.

LIST OF REFERENCE NUMERALS

1 Hybrid module
2 Stator
3 Rotor
4 Electric machine
5 First rotary component
6 Second rotary component
7 Torsional vibration damper
8 Clutch device/Dual clutch
9 Rotor coil
10 Rotor carrier
11 Rotary connection
12 First clutch component
13 First part-clutch
14 Fluid distributor unit
15 Central component
16 Rotor position sensor
17 First gear input shaft
18 Second gear input shaft
19 Rotation axis
20 Drive train
21 Module housing
22 Sleeve region
23 Second clutch component of the first part-clutch
24 Second clutch component of the second part-clutch
25 Second part-clutch
26 Roller bearing
27 Encoder
28 Actuation system
29a First piston
29b Second piston
30a First actuation element
30b Second actuation element
31 Fluid supply
32a First supply channel
32b Second supply channel
32c Third supply channel
33a First cooling channel
33b Second cooling channel
34 Discharge channel
35 Cooling device
36 Friction element
37 Second roller bearing
38 Toothed wheel
39 Input shaft
40 Flange
41 Cylinder
42 Piston ring
43 Support ring
44 Compensation cylinder of the first piston
45 Compensation cylinder of the second piston
46 First reference arrow
47 Second reference arrow
48 Third reference arrow

The invention claimed is:

1. A hybrid module for a drive train of a motor vehicle, comprising: an electric machine having a stator and a rotor, a torsional vibration damper having at least one rotary component, and an integrated clutch device which is constructed as a dual clutch having a first part-clutch and a second part-clutch, wherein a rotor carrier which receives the rotor is connected directly via a permanent rotary connection to the at least one rotary component, wherein the rotor carrier forms a clutch component of the first part-clutch and the second part-clutch of the clutch device.

2. The hybrid module as claimed in claim 1, wherein the torsional vibration damper has a first rotary component which forms a primary mass and a second rotary component which forms a secondary mass, wherein the two rotary components can be rotated relative to each other by a specific adjustment range and the rotary connection is formed between the second rotary component and the rotor carrier.

3. The hybrid module as claimed in claim 2, wherein the first rotary component is prepared for rotationally secure fitting to an output shaft of an internal combustion engine so that a torque can be absorbed by the internal combustion engine and by the rotor carrier via the first rotary component and the second rotary component.

4. The hybrid module as claimed in claim 1, wherein the torsional vibration damper is formed by combining a bow spring damper and a speed-adaptive damper.

5. The hybrid module as claimed in claim 1, wherein the electric machine is fluid-cooled.

6. The hybrid module as claimed in claim 1, wherein the rotary connection is constructed as a plug-in tooth arrangement.

7. The hybrid module as claimed in claim 1, wherein the dual clutch is constructed to be fluid-cooled, wherein there is provided a fluid distributor unit which serves to support the rotor carrier.

8. The hybrid module as claimed in claim 1, wherein the dual clutch is provided with a separately controllable fluid cooling.

9. The hybrid module as claimed in claim 1, wherein a rotor position sensor which detects a rotation position of the rotor or a temperature sensor is/are provided.

10. A drive train for a motor vehicle having a hybrid module as claimed in claim 1 and an internal combustion engine, wherein an output shaft of the internal combustion engine is connected to the torsional vibration damper in a rotationally secure manner.

* * * * *